United States Patent
Kim et al.

(10) Patent No.: US 9,624,847 B2
(45) Date of Patent: Apr. 18, 2017

(54) METHOD AND APPARATUS TO STABILIZE ENGINE STATE SELECTION USING AN ENERGY BASED STABILIZATION STRATEGY FOR HYBRID POWERTRAIN SYSTEMS

(71) Applicant: GM GLOBAL TECHNOLOGY OPERATIONS LLC, Detroit, MI (US)

(72) Inventors: Kee Yong Kim, Ann Arbor, MI (US); Anthony H. Heap, Ann Arbor, MI (US); John Janczak, Commerce Township, MI (US); Samantha Victoria Lado, Pittsfield Township, MI (US); YaoYao Wei, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 84 days.

(21) Appl. No.: 14/820,049

(22) Filed: Aug. 6, 2015

(65) Prior Publication Data
US 2016/0208718 A1 Jul. 21, 2016

Related U.S. Application Data (60) Provisional application No. 62/104,367, filed on Jan. 16, 2015.

(51) Int. Cl.
*F02D 41/14* (2006.01)
*F02D 29/02* (2006.01)
(Continued)

(52) U.S. Cl.
CPC .............. *F02D 29/02* (2013.01); *B60W 20/00* (2013.01); *B60W 30/1882* (2013.01);
(Continued)

(58) Field of Classification Search
CPC ............. F02D 41/0087; F02D 41/1406; F02D 41/1402; F02D 41/1409; F02D 11/105; B60W 30/182
See application file for complete search history.

(56) References Cited

U.S. PATENT DOCUMENTS

| 8,880,255 B2 | 11/2014 | Heap et al. | |
| 2009/0070019 A1* | 3/2009 | Heap ...................... | B60K 6/445 701/112 |

* cited by examiner

*Primary Examiner* — Ramya Burgess
*Assistant Examiner* — David Morris
(74) *Attorney, Agent, or Firm* — Quinn IP Law (57) ABSTRACT

A method for controlling operation of a multi-mode powertrain system includes periodically determining a power cost difference between a first power cost and a second power cost. This includes determining the first power cost associated with operating the powertrain system with the engine operating in a presently commanded engine state in response to an operator torque request and determining the second power cost associated with an expected powertrain operation with the engine operating in a non-commanded engine state in response to the operator torque request. The first power cost is compared with the second power cost, and successive iterations of the periodically determined power cost difference between the first power cost and the second power cost are integrated to determine an integrated power cost difference. A transition to the non-commanded engine state is commanded when the integrated power cost difference is greater than a threshold.

19 Claims, 4 Drawing Sheets

(51) Int. Cl.
    *F02D 41/00*     (2006.01)
    *B60W 20/00*     (2016.01)
    *B60W 30/188*     (2012.01)
    *F02D 11/10*     (2006.01)
    *B60W 30/182*     (2012.01)
    *F02N 11/08*     (2006.01)

(52) U.S. Cl.
    CPC ........ *F02D 11/105* (2013.01); *F02D 41/0087* (2013.01); *F02D 41/1406* (2013.01); *B60W 30/182* (2013.01); *F02D 41/1402* (2013.01); *F02D 2041/1409* (2013.01); *F02N 11/0814* (2013.01)

METHOD AND APPARATUS TO STABILIZE ENGINE STATE SELECTION USING AN ENERGY BASED STABILIZATION STRATEGY FOR HYBRID POWERTRAIN SYSTEMS

CROSS-REFERENCE TO RELATED APPLICATIONS

This application claims the benefit of U.S. Provisional Application No. 62/104,367, filed Jan. 16, 2015, which is hereby incorporated by reference in its entirety.

TECHNICAL FIELD

This disclosure relates to powertrain system employing multiple torque-generative devices and dynamic system controls associated therewith.

BACKGROUND

The statements in this section merely provide background information related to the present disclosure. Accordingly, such statements are not intended to constitute an admission of prior art.

Powertrain systems may be configured to transfer torque originating from multiple torque-generative devices through a torque transmission device to an output member that may be coupled to a driveline. Such powertrain systems include hybrid powertrain systems and extended-range electric vehicle systems. Control systems for operating such powertrain systems operate the torque-generative devices and apply torque transfer elements in the transmission to transfer torque in response to operator-commanded output torque requests, taking into account fuel economy, emissions, drivability, and other factors. Exemplary torque-generative devices include internal combustion engines and non-combustion torque machines. The non-combustion torque machines may include electric machines that are operative as motors or generators to generate a torque input to the transmission independently of a torque input from the internal combustion engine. The torque machines may transform vehicle kinetic energy transferred through the vehicle driveline to electrical energy that is storable in an electrical energy storage device in what is referred to as a regenerative operation. A control system monitors various inputs from the vehicle and the operator and provides operational control of the hybrid powertrain, including controlling transmission operating state and gear shifting, controlling the torque-generative devices, and regulating the electrical power interchange among the electrical energy storage device and the electric machines to manage outputs of the transmission, including torque and rotational speed.

Known methods for managing transitions and stabilizing states of internal combustion engines between fueled and unfueled states and all-cylinder and cylinder deactivation states include evaluating power loss differences amongst the available engine states, wherein a transition to a new engine state may be commanded when a difference in power loss between the present state and a target state is greater than a threshold power loss. This may result in over-stabilization when a large value for the threshold power loss is selected by not realizing the benefits of transitioning when the power loss difference is small over a long duration of time. This may result in under-stabilization and engine transition busyness when a small value for the threshold power loss is selected.

SUMMARY

A multi-mode powertrain system including an internal combustion engine operative in one of a plurality of engine states is described. A method for controlling operation includes periodically determining a power cost difference between a first power cost and a second power cost. This includes determining the first power cost associated with operating the powertrain system with the engine operating in a presently commanded engine state in response to an operator torque request and determining the second power cost associated with an expected powertrain operation with the engine operating in a non-commanded engine state in response to the operator torque request. The first power cost is compared with the second power cost, and successive iterations of the periodically determined power cost difference between the first power cost and the second power cost are integrated to determine an integrated power cost difference. A transition to the non-commanded engine state is commanded when the integrated power cost difference is greater than a threshold.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which:

FIGS. 4-1, 4-2, and 4-3 each graphically shows operation of a multi-mode powertrain system employing an embodiment of the engine state stabilization process, in accordance with the disclosure.

DETAILED DESCRIPTION

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

Figure 1:
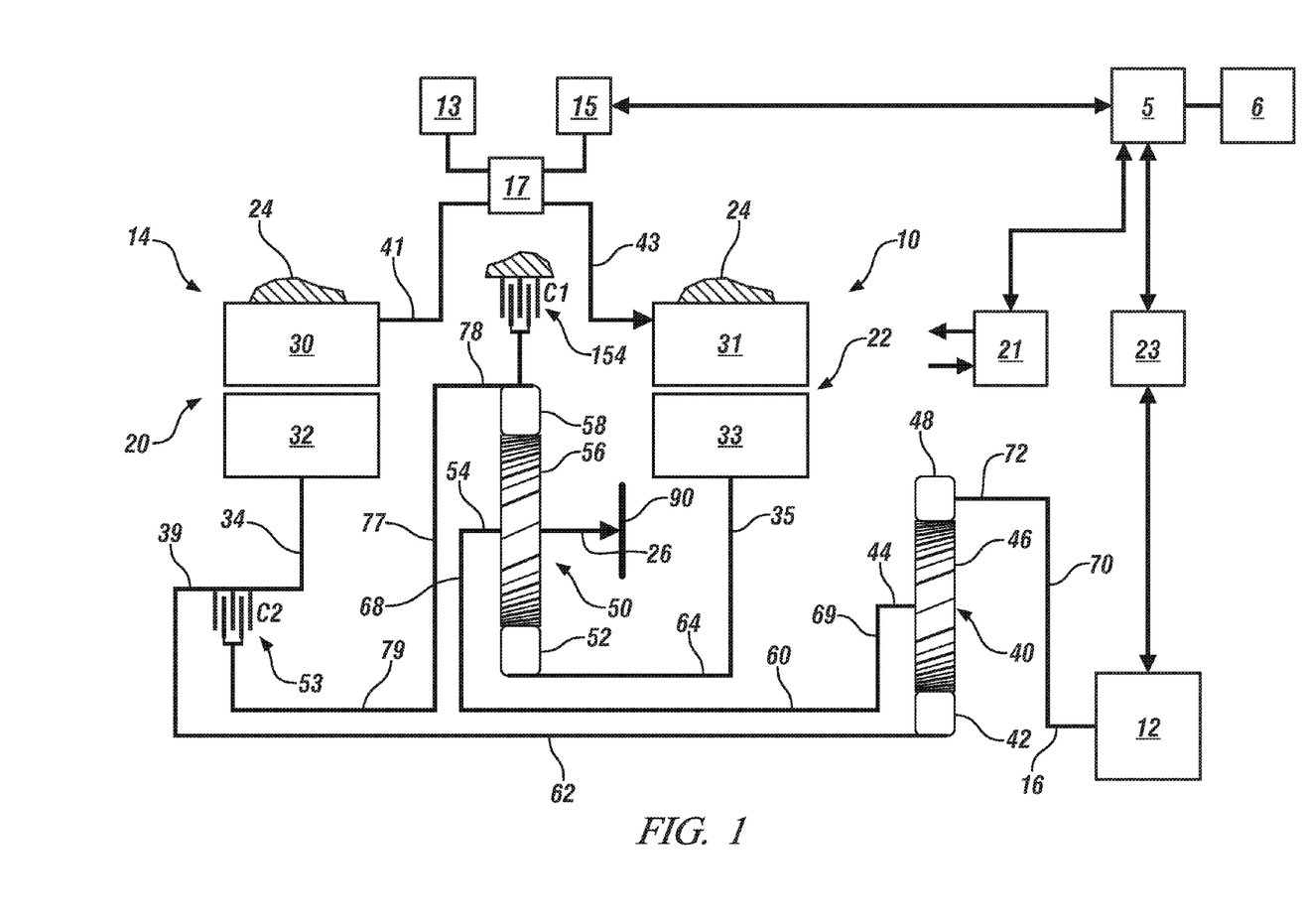
FIG. 1 schematically illustrates a powertrain having an internal combustion engine rotatably coupled to an electro-mechanical transmission, in accordance with the disclosure.

Referring now to the drawings, wherein the showings are for the purpose of illustrating certain exemplary embodiments only and not for the purpose of limiting the same, FIG. 1 schematically illustrates a powertrain 10 having an internal combustion engine 12 rotatably coupled to an electro-mechanical transmission 14. An output member of the engine 12 couples to an input member 16 of the transmission 14 either directly, through an intervening clutch, or through an intervening torque converter device.

A first electric machine 20 and a second electric machine 22 are packaged within a case housing/ground 24 and operatively connect between the input member 16 and a transmission output member 26 that reacts with a driveline 90. The first electric machine 20 includes an annular stator 30 grounded to the transmission casing 24, an annular rotor 32 supported on and for rotation with a rotatable rotor hub 34. A high-voltage battery 13, power inverter 17 and inverter controller 15 operatively connected with the stator 30 via transfer conductors 41 to control operation of the first electric machine 20 as a motor in which stored electrical power is provided by the battery 13 to the stator 30 or the electrical power can be provided by the road when the second electric machine 22 is acting as a generator, and a generator in which torque of the rotating rotor 32 is converted to electrical power stored in the battery 13 or used by the second electric machine 22. Similarly, the second electric machine 22 includes an annular stator 31 grounded to the transmission casing 24, an annular rotor 33 supported on a rotatable rotor hub 35. The power inverter 17 electrically connects with the stator 31 via transfer conductors 43 to control operation of the second electric machine 22 as a motor and a generator.

The transmission 14 includes first and second planetary gear sets 40, 50, respectively. Planetary gear set 40 has a first member that is a sun gear 42, a second member that is a carrier member 44 that rotatably supports a plurality of pinion gears 46 meshing with the sun gear 42, and a third member that is a ring gear 48 meshing with the pinion gears 46. Planetary gear set 50 has a first member that is a sun gear 52, a second member that is a carrier member 54 that rotatably supports a plurality of pinion gears 56 meshing with the sun gear 52, and a third member that is a ring gear 58 meshing with the pinion gears 56. Rotor hub 35 rotates in concert with the sun gear 52 by intermediate sleeve shaft 64.

The transmission 14 includes a first clutch 53 and a second clutch 51. The first clutch 53 is a grounding clutch or brake that is selectively activated to ground the ring gear member 58 to the transmission casing 24. The input member 16 is axially spaced from and not concentric with shaft 60, which couples the carrier member 44 of the first planetary gear set 40 and the carrier member 54 of the second planetary gear set 50. Shaft 72 is coaxial with the input member 16. Input member 16 couples to hub member 70 and axially-extending portion 72 to couple the input member 16 for common rotation with the ring gear 48. Shaft 62 couples rotor hub 34 with sun gear 42 via hub member 37 and an axially-extending portion 39. The second clutch 51 nests between an axially extending portion 39, a hub and a shaft. A hub member 77 is connected with the second clutch 51. A separate sleeve shaft 60 is concentric with shaft 62 and couples carrier member 54 and hub members 68 and 69 to carrier member 44. Sleeve shaft 64 couples rotor hub 35 with sun gear 52. Axially-extending member 78, hub 77 and axially-extending member 79, which is an annular shaft, couple the second clutch 51 with the first clutch 53 and ring gear 58. Axial-extending member 78 circumscribes the planetary gear set 50. It will be appreciated that the ring gear member 58 is decoupled from the sun gear member 42 when the second clutch 51 is deactivated.

An engine control module (ECM) 23 operativey connects to the engine 12, and functions to acquire data from sensors and control actuators of the engine 12 over a plurality of discrete lines. The ECM 23 monitors an actual engine input torque provided to the transmission 14 at that point in time based upon monitored engine speed and load, which is communicated to a hybrid control module (HCP) 5. The inverter controller 15 monitors a first motor torque of the first electric machine 20 and a second motor torque of the second electric machine 22. Alternatively, two inverter controllers can be utilized, each controller monitoring respective ones of the first and second electric machines 20, 22, respectively.

The HCP 5 communicates with an engine control module (ECM) 23, the inverter controller 15, and a transmission control module (TCM) 21, along with other devices. The HCP 5 provides supervisory control over the ECM 23 and the inverter controller 15 and an operator interface device 6 that receives commands from a vehicle operator. The HCP 5 coordinates torque commands amongst the engine 12 and the first and second torque machines 20, 22 in response to an operator input to the operator interface device 6. The HCP 5 coordinates torque commands amongst the engine 12 and the first and second torque machines 20, 22 to control output torque in response to an operator torque request input to the operator interface device 6.

The operator interface device 6 includes one or a plurality of devices through which the operator commands operation of the vehicle and powertrain system, including, e.g., an accelerator pedal, a brake pedal, an ignition key, a transmission range selector, cruise control, and other related devices. The operator interface device 6 generates commands for operating the powertrain system, including, e.g., an ignition Key-ON/Key-OFF state, a transmission range selection, e.g., one of Park, Reverse, Neutral and Drive, an operator torque request, an operator vehicle speed request, and other related commands. The operator interface device 6 is shown as a unitary device for ease of illustration.

The engine 12 can be either ON or OFF. The engine is considered to be ON when the engine is spinning, and OFF when the engine is not spinning. When the engine is ON, it may operate in one of a plurality of engine states, including a full-cylinder state (full cylinder), a cylinder-deactivation state (AFM), a fuel cutoff state with all cylinders active state (full cylinder-zero fuel) and an engine state that includes a combination of AFM and FCO (AFM zero fuel). The aforementioned engine states are example engine states that are helpful in describing the concepts associated with this disclosure. Other engine states may be employed within the scope of this disclosure.

The full cylinder state includes having all cylinders fueled and firing to generate torque. The AFM state includes having a portion of the cylinders fueled and firing to generate torque and the remaining cylinders are unfueled, not firing, and not generating torque, preferably with the unfueled cylinders also having either or both their intake valves and their exhaust valves deactivated in closed states. The full cylinder-zero fuel state includes having all cylinders unfueled, not firing, and not generating torque, but spinning. The AFM zero fuel engine state includes having all cylinders unfueled, not firing, and not generating torque, and a portion of the cylinders also operating with either or both their intake valves and their exhaust valves deactivated in closed states.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic routines to control operation of actuators. Routines may be executed at regular intervals, for example each 100 microseconds or 3.125, 6.25, 12.5, 25 and 100 milliseconds during ongoing operation. Alternatively, routines may be executed in response to occurrence of a triggering event. Communications between controllers and between controllers, actuators and/or sensors may be accomplished using a direct wired link, a networked communications bus link, a wireless link or any another suitable communications link. Communications includes exchanging data signals in any suitable form, including, for example, electrical signals via a conductive medium, electromagnetic signals via air, optical signals via optical waveguides, and the like. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine. In one embodiment, this includes as follows.

Figure 2:
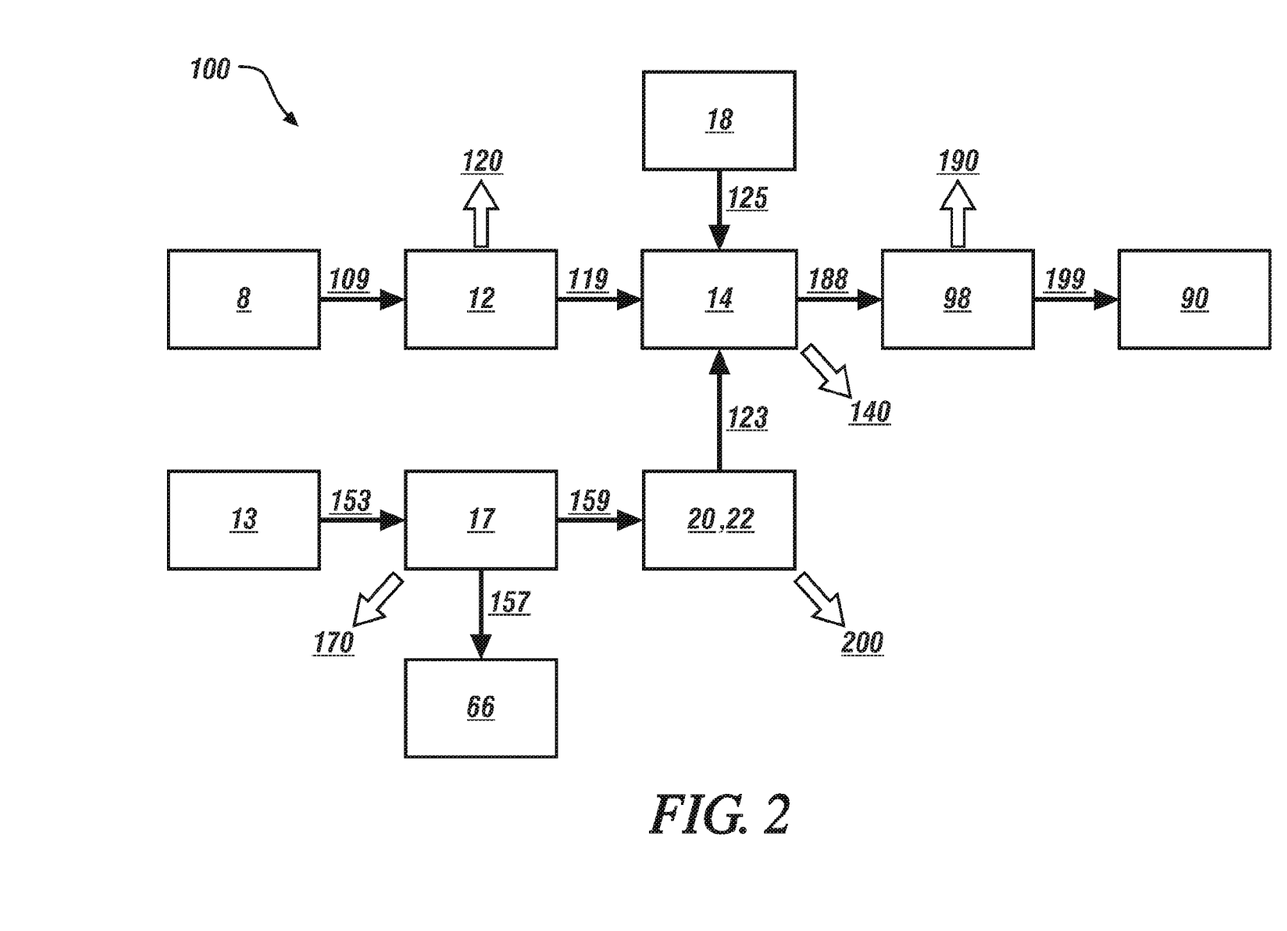
FIG. 2 schematically illustrates an analytic framework for determining powertrain system operating costs for an exemplary power cost function, which is described with reference to the multi-mode powertrain system described with reference to FIG. 1, in accordance with the disclosure.

FIG. 2 schematically illustrates an exemplary power cost function 100, which provides an analytic framework for determining power costs and is described with reference to the multi-mode powertrain system 10 described with reference to FIG. 1. Powertrain elements include engine 12, transmission 14, non-combustion electric machine(s) 20, 22, battery 13, inverter 17, wheel brakes 98, driveline 90, and a fuel storage system 8. Pseudo-elements include an inertial load 18, which is an element constructed to account for system inertias, and high-voltage electrical load 66, which is an element constructed to account for high-voltage loads in the vehicle outside that load used for the powertrain system 10. Power flow paths include a first power flow path 109 from the fuel storage system 8 to transfer fuel power to the engine 12, a second power flow path 119 between the engine 12 and the transmission 14, a third power flow path 153 between the battery 13 and the inverter 17, a fourth power flow path 157 between the inverter 17 and the high-voltage electrical load 66, a fifth power flow path 159 between the inverter 17 and the non-combustion electric machine(s) 20, 22, a sixth power flow path 123 between the non-combustion electric machine(s) 20, 22 and the transmission 14, a seventh power flow path 125 between the inertial load 18 and the transmission 14, an eighth power flow path 188 and the wheel brakes 98, and a ninth power flow path 199 to the driveline 90. Power losses include engine power losses 120, battery power losses 170, mechanical power losses 140, electric motor losses 200 and brake power losses 190. A total power cost can include a sum of the engine power losses 120, the battery power losses 170, the mechanical power losses 140, electric motor losses 200 and brake power losses 190. The power cost inputs to the power cost function 100 are determined based upon factors related to vehicle drivability, fuel economy, emissions, and battery usage. Power costs may be expressed in terms of kilowatts (kW) or other suitable units, are assigned and associated with fuel and electrical power consumption for specific operating points of the multi-mode powertrain. Lower power costs can be associated with lower fuel consumption at high conversion efficiencies, lower battery power usage, and lower emissions for each engine speed/load operating point, and take into account the candidate engine state for the engine 12. The power costs may include the engine power losses 120, electric motor power losses 200, battery power losses 170, brake power losses 190, and mechanical power losses 140 associated with operating the multi-mode powertrain at specific operating points for the engine 12 and the non-combustion electric machine(s) 20, 22 while operating in response to the operator torque request. Subjective costs can be assigned and include, but not limited to, torque request costs, battery state of charge costs and output speed costs. The power cost function 100 may be employed to determine a total cost for operating the multi-mode powertrain system 100 at a selected engine operating point and operating in response to the operator torque request. Accordingly, a total power cost can include the sum of the subjective costs plus the engine power losses 120, the battery power losses 170, the mechanical power losses 140, the electric motor losses 200, and the brake power losses 190 at any selected transmission operating range state and selected one of the engine states in response to the operator torque request.

Figure 3:
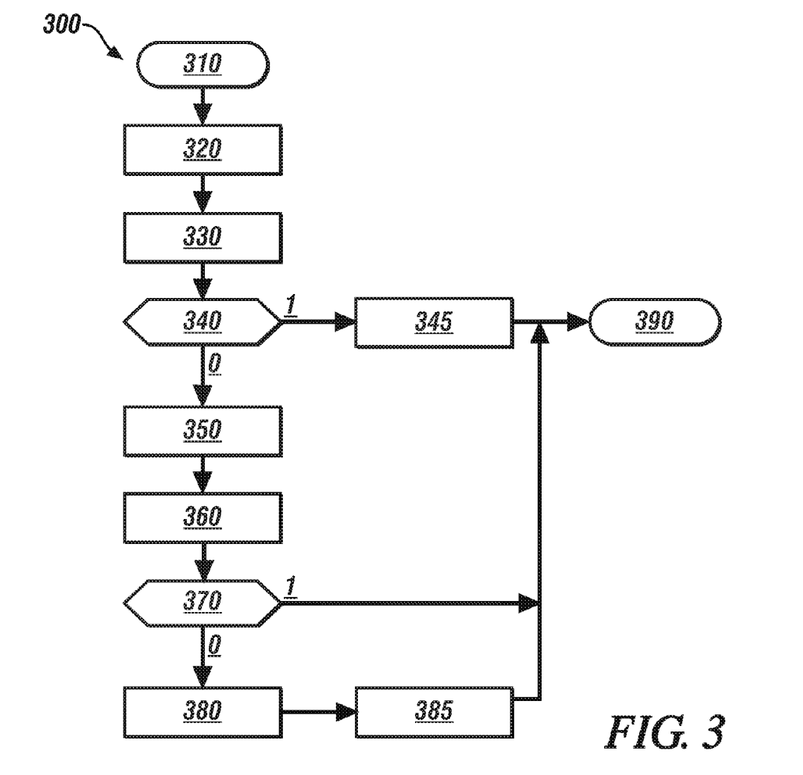
FIG. 3 illustrates an engine state stabilization process for stabilizing selection of one of the engine states for a multi-mode transmission, in accordance with the present disclosure.

FIG. 3 illustrates an engine state stabilization process 300 that includes stabilizing selection of one of the engine states for a multi-mode transmission in accordance with the present disclosure. Stabilizing selection between operating range states reduces shift busyness to increase drivability and fuel economy. The flowchart 300 is described with reference to the multi-mode powertrain system 10 described with reference to FIG. 1. The engine state stabilization process 300 describes a process for stabilizing selection of one of the engine states for a multi-mode transmission in context of the multi-mode powertrain system 10, but the concepts set forth herein may be transferred to and applied to any multi-mode powertrain system that employs an internal combustion engine capable of operating in a plurality of engine states and dynamically changing between engine states during ongoing powertrain operation. Table 1 is provided as a key wherein the numerically labeled blocks and the corresponding functions are set forth as follows, corresponding to the engine state stabilization process 300. Preferably, the engine state stabilization process 300 is implemented as one or a plurality of algorithms and associated calibrations that are reduced to controller-executable instruction sets that can be electronically stored on a non-volatile memory device. The engine state stabilization process 300 is preferably periodically executed, and includes as follows.

TABLE 1

| BLOCK | BLOCK CONTENTS |
|---|---|
| 310 | Start Iteration |
| 320 | Determine power costs (Pcost-j) in each of the engine states including full cylinder, AFM, full cylinder-zero fuel, AFM zero fuel |
| 330 | Compare each Pcost-j with power cost for commanded engine state (Pcost-command) |
| 340 | Is Pcost-j <Pcost-command? |
| 345 | Reset integrated power cost difference $\Sigma\Delta P = 0$ |
| 350 | Determine power cost difference $\Delta P$ = Pcost-command − Pcost-j |
| 360 | Integrate power cost difference $\Sigma\Delta P = \Sigma\Delta P(t - 1) + \Delta P$ |
| 370 | Is $\Sigma\Delta P$ >threshold? |
| 380 | Transition to engine state associated with Pcost-j |
| 385 | Reset integrated power cost difference $\Sigma\Delta P = 0$ |
| 390 | End Iteration |

The engine state stabilization process 300 executes periodically, with each iteration commanded at a set time period, such as once every 100 ms or once every 25 ms (310). Initially, a power cost is determined for operating the powertrain system in response to the operator torque request with the engine 12 operating in each of the engine states including, e.g., the full cylinder state, the AFM state, the full cylinder-zero fuel state, and the AFM zero fuel state (320). The power costs can be determined by taking into consideration and compiling all the costs associated with operating the multi-mode powertrain 10 at specific operating points for the engine 12 and the non-combustion electric machine(s) 20, 22 while operating in response to the operator torque request. FIG. 2 provides an analytic framework for determining powertrain costs for an exemplary powertrain system. Each of the power costs is determined with the engine 12 operating in one of the engine states. The engine state-related power costs are referred to herein as Pcost-j, wherein the index j refers to one of the engine states. Thus j=1 may refer to the full cylinder state, j=2 may refer to the AFM state, j=3 may refer to the full cylinder-zero fuel state, and j=4 may refer to the AFM zero fuel state.

The engine state-related power costs are each compared with the power cost for the presently commanded one of the engine states, referred to herein as Pcost-command (330, 340).

When the power costs associated with all of the non-commanded engine states are greater than the power cost for the presently commanded one of the engine states, i.e., Pcost-command (340)(0), an integrated power cost difference $\Sigma\Delta P$ is reset to zero ($\Sigma\Delta P$=0) (345), and this iteration ends (390). Alternatively, Step 345 may include reducing engine state-specific integrated power cost difference $\Sigma\Delta P$s by the power costs associated with corresponding ones of the non-commanded engine states.

When the power cost associated with one of the non-commanded engine states is greater than the power cost for the presently commanded one of the engine states, i.e., Pcost-command (340)(1), a power cost difference $\Delta P$ is determined ($\Delta P$=Pcost-command−Pcost-j) (350) and added to the integrated power cost difference $\Sigma\Delta P$ that was determined during a previous iteration of the engine state stabilization process 300 (360) as follows:

$$\Sigma\Delta P = \Sigma\Delta P(t-1) + \Delta P \quad [1]$$

The integrated power cost difference $\Sigma\Delta P$ may be calculated or otherwise determined for each of the presently non-commanded engine states, with the following analysis and decision-making (Steps 370, 380, 385) executed for any or all of the presently non-commanded engine states. Since the engine state stabilization process 300 executes periodically, a time element equal to the iteration period is incorporated into the power cost difference $\Delta P$, which renders the integrated power cost difference $\Sigma\Delta P$ as an energy term (power×time). The new value for the integrated power cost difference $\Sigma\Delta P$ is compared to a power cost threshold (Threshold) (370), and if less than the power cost threshold (370)(0), this iteration ends (390). If the new value for the integrated power cost difference $\Sigma\Delta P$ is equal to or greater than the power cost threshold (370)(1), the engine is commanded to transition to the previously non-commanded engine state that has an integrated power cost difference $\Sigma\Delta P$ that is less than the power cost associated with the presently commanded one of the engine states (380). The integrated power cost difference $\Sigma\Delta P$ is reset to zero ($\Sigma\Delta P$=0) (385), and this iteration ends (390). As such, the integrated power cost difference $\Sigma\Delta P$ generated by the engine state stabilization process 300 provides a capability to stabilize engine state transitions based upon time-integrated power, or energy.

This enables the stabilization function to comprehend a difference in energy losses by differentiating between the time durations of the same amount of power loss differences amongst the engine states. This serves to prevent engine state transition busyness while allowing transitions even at low levels of difference between the commanded engine state and one or more target engine states.

Figure 41:
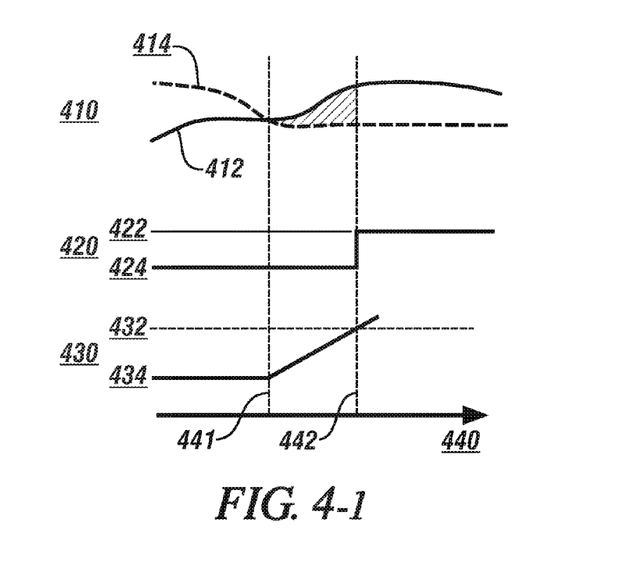
Figure 42:
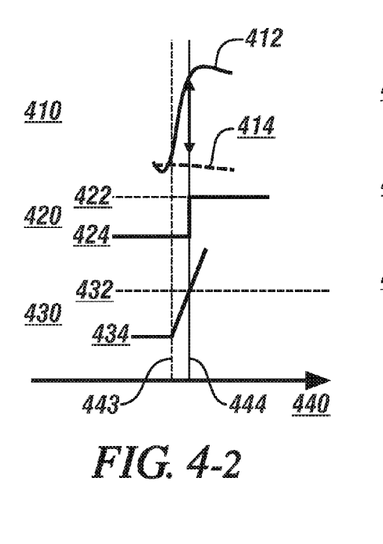
Figure 43:
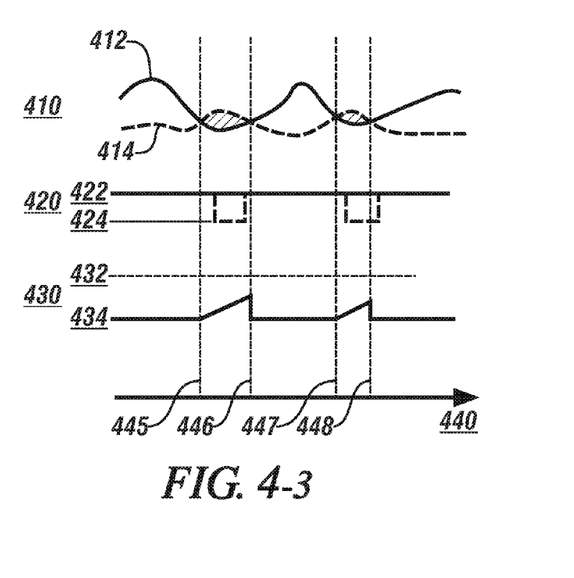

FIGS. 4-1, 4-2, and 4-3 each graphically shows operation of a multi-mode powertrain system 10 employing an embodiment of the engine state stabilization process 300 described herein. Plotted data includes power costs, including a power cost for a first of the engine states Pcost-S1 412 and a power cost for a second of the engine states Pcost-S2 414, a commanded engine state including either Engine State 1 424 or Engine State 2 422, and an integrated power cost difference $\Sigma\Delta P$ 434 and associated power cost threshold $\Sigma\Delta P$ threshold 432, all in relation to time, which is shown on a horizontal axis.

Referring to FIG. 4-1, the power cost for the second engine state Pcost-S2 414 is greater than the power cost for the first engine state Pcost-S1 412, and Engine State 1 424 is the commanded engine state. At time t1 441, the second engine state Pcost-S2 414 becomes less than the power cost for the first engine state Pcost-S1 412. The integrated power cost difference $\Sigma\Delta P$ 434 increases, and at time t2 442, exceeds the power cost threshold $\Sigma\Delta P$ threshold 432. Accordingly, at time t2 442 the commanded engine state transitions from Engine State 1 424 to Engine State 2 422.

Referring to FIG. 4-2, the power cost for the second engine state Pcost-S2 414 is greater than the power cost for the first engine state Pcost-S1 412, and Engine State 1 424 is the commanded engine state. At time t1 443, second engine state Pcost-S2 414 becomes less than the power cost for the first engine state Pcost-S1 412. The integrated power cost difference $\Sigma\Delta P$ 434 increases, and at time t2 444, exceeds the power cost threshold $\Sigma\Delta P$ threshold 432. Accordingly, at time t2 444 the commanded engine state transitions from Engine State 1 424 to Engine State 2 422. This case indicates that the integrated power cost difference $\Sigma\Delta P$ 434 can accumulated quickly, with the time period between a change in the power cost at t1 442 and the engine state transition at t2 444 occurring quickly, e.g., within one iteration of the engine state stabilization process 300.

Referring to FIG. 4-3, the power cost for the second engine state Pcost-S2 414 is less than the power cost for the first engine state Pcost-S1 412, and Engine State 2 422 is the commanded engine state. At time t1 445, the second engine state Pcost-S2 414 becomes greater than the power cost for the first engine state Pcost-S1 412. The integrated power cost difference ΣΔP 434 increases until time t2 446, at which point the second engine state Pcost-S2 414 becomes less than the power cost for the first engine state Pcost-S1 412 without exceeding the power cost threshold ΣΔP threshold 432. Accordingly, the commanded engine state remains Engine State 2 422 throughout. At time t3 447, the second engine state Pcost-S2 414 again becomes greater than the power cost for the first engine state Pcost-S1 412. The integrated power cost difference ΣΔP 434 increases until time t4 448, at which point the second engine state Pcost-S2 414 becomes less than the power cost for the first engine state Pcost-S1 412 without exceeding the power cost threshold ΣΔP threshold 432. Accordingly, the commanded engine state remains Engine State 2 422 throughout. This case indicates that the integrated power cost difference ΣΔP 434 may be employed to avoid unneeded engine state transitions.

Figure 5:
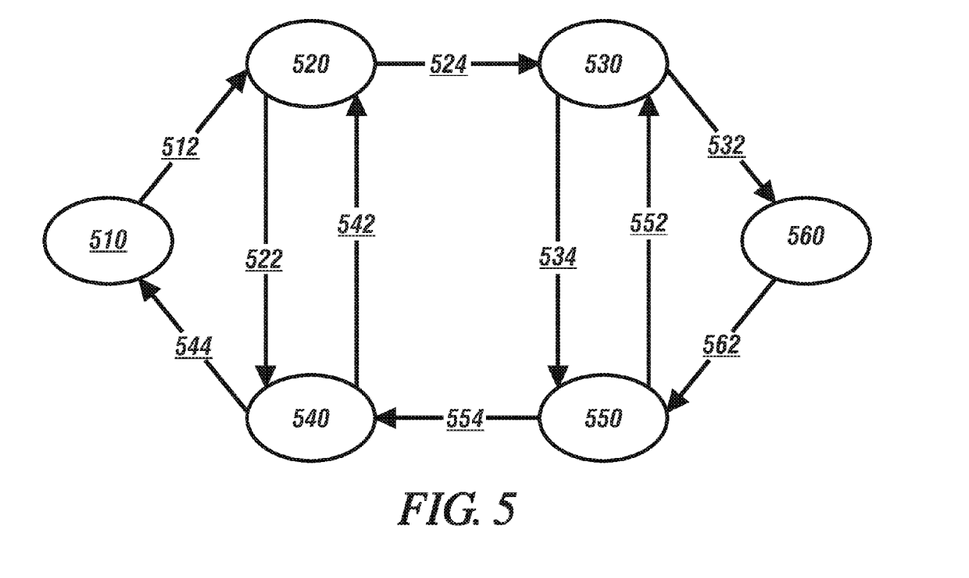
FIG. 5 schematically shows an engine state transition logic process that employs the engine state stabilization process described with reference to FIG. 3 and includes a change of mind operation.

FIG. 5 schematically shows an engine state transition logic process 500 that employs the engine state stabilization process 300 described with reference to FIG. 3 and includes a change of mind operation. The engine states include engine state A and engine state B, which may include any selected two of the full cylinder state, the AFM state, the full cylinder-zero fuel state, and the AFM zero fuel state as described herein, and/or other engine suitable states. Element 510 indicates powertrain operation with the engine operation stabilized at engine state A, and Element 560 indicates powertrain operation with the engine operation stabilized at engine state B. Engine operation is said to be stabilized at an engine state when all cylinders are operating in accordance with the selected engine state. This engine state transition logic process 500 comprehends state transitions between two engine states, and can become more complicated when all four of the engine states are incorporated.

The engine state transition logic process 500 including a change of mind operation includes as follows. When an outcome of the engine state stabilization process 300 commands the engine to transition from stabilized engine state A 510 to stabilized engine state B 560, the preferred transition route includes a first transition 512 to an uncommitted engine state A to B 520, which includes starting to transition the engine to operate in engine state B, but without stabilized operation. By way of example, when stabilized engine state A 510 includes operating the engine in the full cylinder-zero fuel state and stabilized engine state B 560 includes operating the engine in the all-fuel state, the transition to stabilized engine state B 560 may be commanded in response to an operator accelerator pedal tip-in to command more power, and the first transition 512 may include executing an engine manifold pump-down in order to minimize engine flare and other factors that may affect engine instability and reduce vehicle pleasability.

During operation in the uncommitted engine state A to B 520, a change in operating conditions may cause a change in the desired engine state back to engine state A, which dictates a second transition 522 to stabilizing engine state A 540. The second transition 522 may be commanded when the transition during the uncommitted engine state A to B 520 is not far advanced, e.g., when only one or two cylinders have been fueled and fired if the target transition is from operating the engine in the full cylinder-zero fuel state to operating the engine in the all-fuel state. The operating conditions may relate to any of the operator inputs to the operator interface device 6 described with reference to FIG. 1 or any one of or all of the elements described with reference to the power cost function 100 of FIG. 2.

During operation in the uncommitted engine state A to B 520, when the transition during the uncommitted engine state A to B 520 is advanced, a third transition 524 may be commanded to a stabilizing engine state B 530. This may occur when all but one or, alternatively, two cylinders have been fueled and fired if the target transition is from operating the engine in the full cylinder-zero fuel state to operating the engine in the all-fuel state.

When operating in the stabilizing engine state A 540, a fourth transition 544 to operating in the stabilized engine state A 510 may be commanded when there is no significant change in operating conditions and engine state A 540 has been achieved.

When operating in the stabilizing engine state A 540, a fifth transition 542 to operating in the uncommitted engine state A to B 520 may be commanded when there is a change in operating conditions suggesting such a change, with such operating conditions equivalent to or similar to those associated with executing the first transition 512.

When operating in the stabilizing engine state B 530, a sixth transition 532 to operating in the stabilized engine state B 560 may be commanded when there is no change in operating conditions suggesting such a change and engine state B has been achieved.

When operating in the stabilizing engine state B 530, a seventh transition 534 to operating in uncommitted engine state B to A 550 may be commanded when there is a change in operating conditions suggesting such a change, analogous to the second transition 522.

When operating in the stabilized engine state B 560, an eighth transition 562 to operating in the uncommitted engine state B to A 550 may be commanded in response to an operator accelerator pedal tip-out to a coast condition, and the eighth transition 562 may include discontinuing engine fueling prior to opening engine valves in order to minimize engine instability.

When operating in the uncommitted engine state B to A 550, a ninth transition 552 to operating in the stabilizing engine state B 530 may be commanded when there is a change in operating conditions suggesting such a change, with such operating conditions equivalent to or similar to those associated with executing the first transition 512.

When operating in the uncommitted engine state B to A 550, a tenth transition 554 to operating in the stabilizing engine state A 540 may be commanded when there is no change in operating conditions and the commitment criteria have been achieved.

In this manner, the engine state transition logic process 500 includes a change of mind operation that comprehends that engine state transitions are not instantaneously executed, and thus allows for executing engine state transitions that allow for, permit and accommodate a change of mind without negatively affecting drivability and operator perceptions.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for operating a multi-mode powertrain system including an internal combustion engine operative in a plurality of engine states, the method comprising:
periodically determining a power cost difference between a first power cost and a second power cost, including:
determining the first power cost associated with operating the powertrain system with the engine operating in a presently commanded engine state in response to an operator torque request,
determining the second power cost associated with an expected powertrain operation with the engine operating in a non-commanded engine state in response to the operator torque request, and
comparing the first power cost with the second power cost;
integrating, by a controller, successive iterations of the periodically determined power cost difference between the first power cost and the second power cost to determine an integrated power cost difference; and
commanding a transition to the non-commanded engine state when the integrated power cost difference is greater than a threshold.

2. The method of claim 1, wherein the engine states include a full cylinder state, a cylinder-deactivation state, a full cylinder-zero fuel state, and a cylinder-deactivation/zero fuel state.

3. The method of claim 1, further comprising resetting the integrated power cost difference to zero when the first power cost is greater than the second power cost.

4. The method of claim 1, wherein determining the first power cost associated with operating the powertrain system with the engine operating in the presently commanded engine state in response to the operator torque request comprises determining a power cost associated with fuel and electrical power consumption for operating the multi-mode powertrain system with the engine operating in the presently commanded engine state in response to the operator torque request.

5. The method of claim 1, further comprising commanding the transition to the non-commanded engine state only when the integrated power cost difference is greater than the threshold.

6. The method of claim 1, further comprising transitioning from an initial engine state including the presently commanded engine state to a final engine state including to the non-commanded engine state including executing an engine state transition logic process including a change of mind operation.

7. The method of claim 6, wherein executing the engine state transition logic process including the change of mind operation comprises transitioning from the initial engine state to an uncommitted engine state.

8. The method of claim 7, further comprising transitioning from the uncommitted engine state back to the initial engine state in response to a change in operating conditions when a transition during the uncommitted engine state is not far advanced.

9. The method of claim 8, wherein the change in operating conditions comprises a change in an operator input to an accelerator pedal.

10. The method of claim 7, further comprising transitioning from the uncommitted engine state to a stabilizing engine state when a transition during the uncommitted engine state is advanced.

11. The method of claim 10, wherein transitioning to the stabilizing engine state includes executing an engine manifold pump-down.

12. The method of claim 10, wherein transitioning to the stabilizing engine state includes discontinuing engine fueling prior to opening engine valves.

13. The method of claim 10, further comprising transitioning from the stabilizing engine state to the final engine state when the transition is advanced and there is no change in the operating conditions.

14. A multi-mode powertrain system, comprising:
an internal combustion engine rotatably coupled to an electro-mechanical transmission and controlled by a controller;
the internal combustion engine being operative in a plurality of engine states,
the controller including executable code, said code operative to:
periodically determine a power cost difference between a first power cost and a second power cost, including code operative to:
determine the first power cost associated with operating the powertrain system with the engine operating in a presently commanded engine state in response to an operator torque request,
determine the second power cost associated with an expected powertrain operation with the engine operating in a non-commanded engine state in response to the operator torque request, and
compare the first power cost with the second power cost;
integrate successive iterations of the periodically determined power cost difference between the first power cost and the second power cost to determine an integrated power cost difference; and
command a transition to the non-commanded engine state when the integrated power cost difference is greater than a threshold.

15. The multi-mode powertrain system of claim 14, wherein the engine states include a full cylinder state, a cylinder-deactivation state, a full cylinder-zero fuel state, and a cylinder-deactivation/zero fuel state.

16. The multi-mode powertrain system of claim 14, further comprising the controller including executable code operative to reset the integrated power cost difference to zero when the first of the power costs is greater than the second of the power costs.

17. The multi-mode powertrain system of claim 14, wherein the controller including executable code operative to determine the power cost associated with operating the powertrain system with the engine operating in the commanded engine state in response to the operator torque request comprises the controller including executable code operative to determine a power cost associated with fuel and electrical power consumption for operating the multi-mode powertrain system with the engine operating in the commanded engine state in response to the operator torque request.

18. The multi-mode powertrain system of claim 14, further comprising the controller including executable code operative to command the transition to the non-commanded engine state only when the integrated power cost difference is greater than the threshold.

19. The multi-mode powertrain system of claim 14, further comprising the controller including executable code operative to transition from an initial engine state including the presently commanded engine state to a final engine state including the non-commanded engine state includes executable code operative to execute an engine state transition logic process including a change of mind operation.

\* \* \* \* \*